(12) United States Patent
Leonard

(10) Patent No.: US 7,159,455 B1
(45) Date of Patent: Jan. 9, 2007

(54) SELF-DUMPING RAIN GAUGE

(75) Inventor: Willie Burt Leonard, 13524 FM 362, Waller, TX (US) 77484

(73) Assignee: Willie Burt Leonard, Houston, TX (US)

( * ) Notice: Subject to any disclaimer, the term of this patent is extended or adjusted under 35 U.S.C. 154(b) by 0 days.

(21) Appl. No.: 11/349,603

(22) Filed: Feb. 8, 2006

(51) Int. Cl.
*G01W 1/00* (2006.01)
(52) U.S. Cl. ................................. 73/170.017
(58) Field of Classification Search ............ 73/170.17, 73/170.16
See application file for complete search history.

(56) References Cited

U.S. PATENT DOCUMENTS 4,906,217 A * 3/1990 O'young ............... 446/267
4,919,165 A * 4/1990 Lloyd .................. 137/78.2

2004/0261516 A1* 12/2004 Simpson ............... 73/170.17

\* cited by examiner

*Primary Examiner*—Jewel Thompson
(74) *Attorney, Agent, or Firm*—Buskop Law Group PC; Wendy K. Buskop

(57) ABSTRACT

A self-dumping rain gauge including a collection container with value indications for gauging rainfall amounts is disclosed. The methodology discovers an apparatus comprising a rain collection container with a top hole, a replaceable rain collection cap containing a rain collection chamber and a plug with channels, a bottom hole, and a siphoning tube located within the rain collection container. The siphoning tube, including an open first end that protrudes through the bottom hole; a curved midpoint, or alternatively an intersecting midpoint, located near the top of the container; and a second end that is within the rain collection container, permits the rain collection container to be self-dumping. A flat surface, with easy to read numbers directly correlating to value indications (e.g., graduation marks, horizontal lines), is attached to the rain collection container to provide a method for gauging amounts of rainfall.

14 Claims, 4 Drawing Sheets

SELF-DUMPING RAIN GAUGE

FIELD

The embodiments generally relate to a self-dumping rain collection container with value indications for gauging amounts of rainfall.

BACKGROUND

Rain gauges, in their most common form as a graduated open-top cylinder, have been used for many years in man's attempt to analyze and measure one environmental aspect, which is rainfall.

The common open-top, clear plastic or glass, graduated cylinder can be accurate in its measurement of rainfall when the rain is falling perpendicular to the earth or ground. However, problems arise because rainfall is usually not perpendicular to the ground. Rather, the rain falls as the result of violent weather conditions in which the wind and rain are blowing in many directions and angles. In these situations, the open-top, clear plastic or glass cylinder becomes quite inadequate for its intended purpose. The reason for this is that the rain, when analyzed from a cross section of the perpendicular direction in which it falls, generally views a circular opening to the rain collecting cylinder. To the contrary, the rain falling at a substantial angle to the perpendicular, views the circular opening to the graduated cylinder as having an elliptical shape. Accordingly, the greater the angle at which the rain is being blown or driven, the greater the elliptical effect and corresponding decrease in accuracy with regard to the open-top, graduated cylinder rain gauge.

Existing rain gauges include rain collectors that can have large numerals and/or words indicating the height of the water collected in the rain collector. These rain collectors usually contain indications, such as lines to indicate the graduations of water height. Corresponding to these indications are usually numerals that can be small or very large. The large numbers can be printed directly on the curved surfaces of these rain collectors provided the collectors are large enough to accommodate the expanded scales. However, with other or smaller rain gauges which have a normal numerical scale and are a low-cost glass tube collector, the area might be insufficient to print large clear numbers that can be easily read due to the reduced size and curved surface of the collector. In addition, many of the existing rain gauges require a manual dumping of the graduated cylinders to achieve an accurate measurement of rainfall, for each measurement.

Thus, a need exists for a self-dumping rain gauge in which the numbers, that indicate the amount of rain that has fallen, are exceptionally easy to read.

A need exists to provide a rain gauge capable of an exceptionally clear indication of water height and rainfall measurement on the rain gauge, and that is relatively inexpensive to manufacture.

The embodiments meet these needs.

BRIEF DESCRIPTION OF THE DRAWINGS

The detailed description will be better understood in conjunction with the accompanying drawings as follows.

Figure 1:
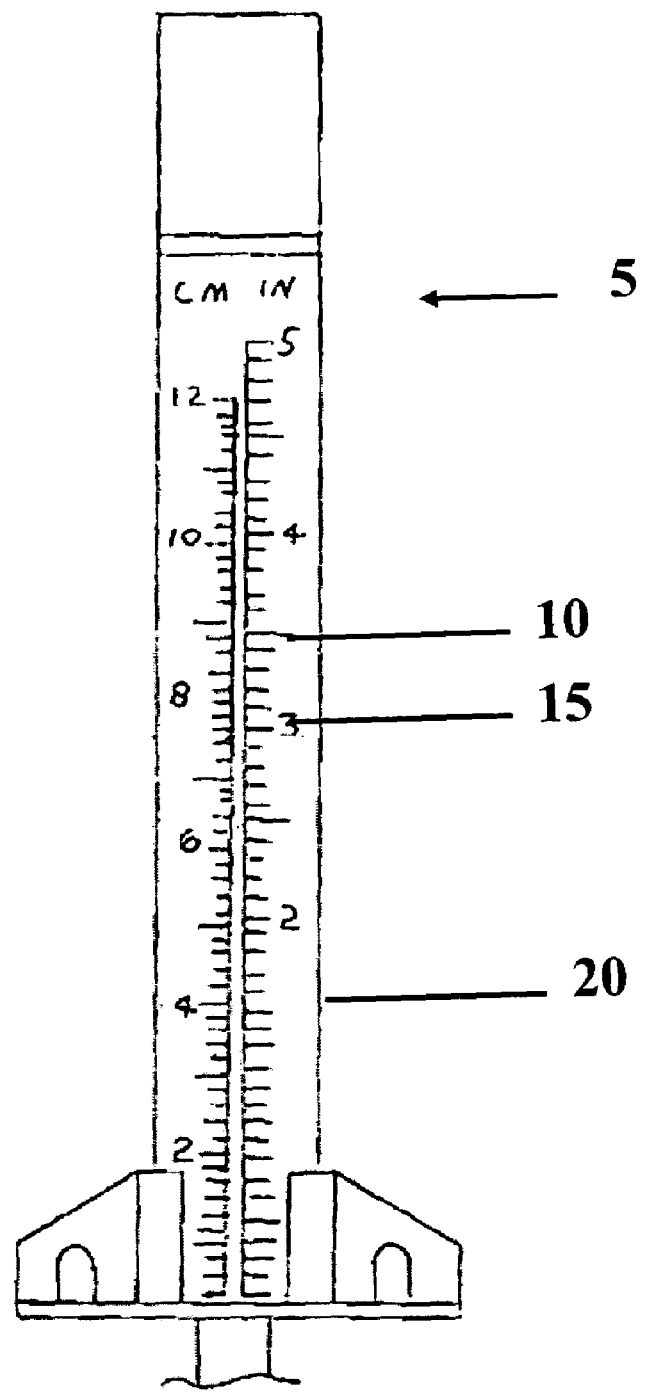
FIG. 1 depicts a side view of a self-dumping rain gauge with value indications and corresponding numbers.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that it can be practiced or carried out in various ways.

The embodiments generally relate to apparatus providing a self-dumping rain collection container with value indications and corresponding numbers for gauging rainfall.

The embodiments include a self-dumping rain gauge comprising a rain collection container with a top hole, a bottom hole, and a siphoning tube located within the rain collection container. The embodiments can include a replaceable rain collector cap. The replaceable rain collector cap can include a rain collection chamber. The self-dumping rain gauge can include a plug with channels. The plug can prevent or decrease the rate of evaporation of the rain collected within the rain collection container. The plug with channels can include a float which can rise when rain water flows through the plug with channels allowing rain water to enter the rain collection container. When water is not flowing through the plug with channels, the float can seal the channels further preventing or decreasing the rate of evaporation of rain water within the rain collection container.

The embodiments allow for the adjustment of the flow of rain water into the rain collection container via the replaceable rain collector cap. The replaceable rain collector caps can come with rain collection chambers of various diameters. The appropriate replaceable rain collector cap can be chosen based on a projected amount of rain fall. For example, if the embodiments are to be used in an area of lower rain fall (for example, half an inch over a month), then a replaceable rain collector cap with a small volume rain collection chamber can be used. In the scenario of lower rain fall, the flow rate of rain into the rain collection chamber is not an issue. Conversely, if the embodiments are to be used in an area of high rain fall, a replaceable rain collector cap with a larger volume rain collection chamber can be used. In the scenario of higher rain fall, a replaceable rain collector cap with a larger volume rain collection chamber diameter can hold more rain while allowing the rain to drain into the rain collection container via the plug with channels at a slower rate. By making these adjustments to the flow rate of rain water into the rain collection container, the performance of the siphoning tube can be optimized.

The embodiments permit the rain gauge to be self-dumping using a siphoning tube positioned within the rain collection container. The siphoning tube includes an open first end that protrudes through the bottom hole of the rain collection container; a midpoint, that is curved or intersecting and positioned near the plug at the top of the rain collection container; and a second end that is within the rain collection container. When the rain that is collected within the container and siphoning tube, reaches the top of the container and the plug with channels, a change in pressure occurs due to a reduction of cross-sectional area between the collection container and the channels of the plug creating a siphoning motion is created that empties the rain from the tube and the surrounding rain collection container by way of the open, first end of the siphoning tube, which is protruding through the bottom hole of the rain collection container. The change in cross-sectional area means that the water level rising in the tube increases when the level reaches the reduced cross-sectional area at the plug. The increase in flow at the reduction of cross-sectional area at the plug in relation to the flow in the siphoning tube creates the self-dumping action.

The embodiments permit a removable flat surface to attach to the rain collection container. The removable flat surface can include at least one set of easy to read value indications, such as graduation marks or horizontal lines indicating a water level. For example, one set of value indications can be in inches and another set of value indications can be in centimeters. The value indications can be in any measurement unit such as inches, centimeters, millimeters, and the like. The removable flat surface can comprise sufficient area to allow placement of visible, easy to read numbers that can be positioned adjacent to the rain collection container and in direct correlation to the value indications. Alternatively, the numbers on the removable flat surface can be aligned with value indications positioned on the back side of the rain collection container for accurate readings of rainfall amounts. The removable flat surface can come in a variety of value indications so that an appropriate removable flat surface can be chosen for any given size of replaceable rain collector caps. For example, a removable flat surface with inch value indications may be appropriate for use with a rain collector cap with a larger diameter when substantial rain fall is expected.

In the embodiments, the rain collecting container can be opaque as a dry container and transparent when wet for enhanced visibility and ease with regard to reading the value indications and numbers.

With reference to the figures, FIG. 1 depicts a side view of an example of a self-dumping rain gauge (5) with value indications (10) and corresponding numbers (15). The value indications (10) can be placed on the back side of the rain container or on a flat surface (20) that can be attached to the rain collecting container. The value indications (10) are easy to read values which can be graduation marks, horizontal lines, and others for indicating a water level. The flat surface (20) can comprise sufficient area to allow placement of visible, easy to read numbers (15) that can be positioned adjacent to the rain collection container and in direct correlation or alignment to the value indications for accurate readings of rainfall amounts. The best or most accurate results are achieved if the lines that indicate the water levels are in substantially the same plane with the numerical values on the flat surface.

Figure 2A:
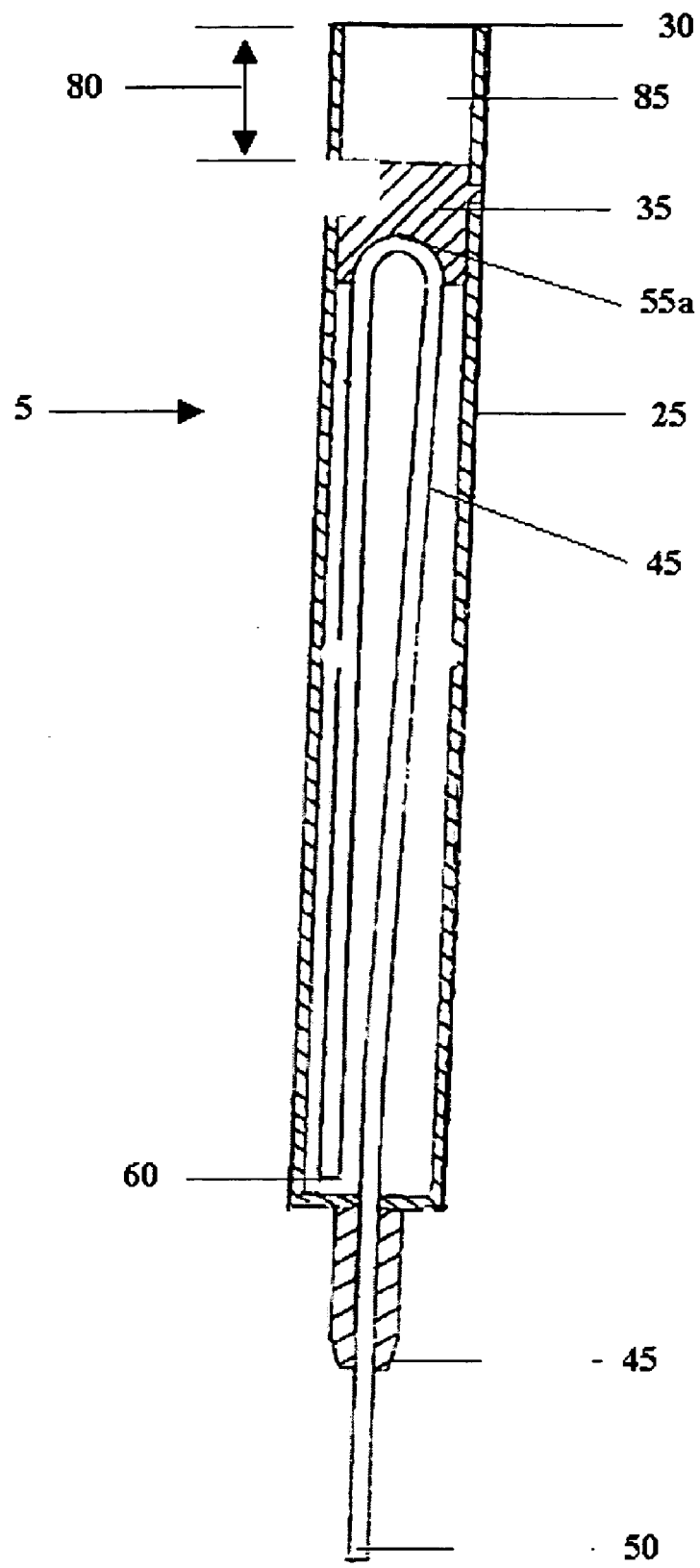
FIG. 2a depicts a cross-sectional side view of a self-dumping rain gauge with a curved midpoint of a siphoning tube within a rain gauge.

FIG. 2a depicts a cross-sectional view of an example of a self-dumping rain gauge (5), including a rain collecting container (25), with a top hole (30), a replaceable rain collection cap (80) with a plug (35) and a rain collection chamber (85), a bottom hole (40), and a siphoning tube (45). The rain gauge is self-dumping using a siphoning tube (45) positioned within the rain collection container (25). The depicted siphoning tube includes an open first end (50) that protrudes through the bottom hole (40) of the rain collection container (25); a curved midpoint (55a) that is positioned in the plug (35) at the top of the rain collection container; and a second end (60) that is within the rain collection container (25). When the rain, that is collected within the container and siphoning tube, reaches the top of the container and midpoint of the siphoning tube, a change in pressure occurs and a siphoning motion is created that empties the rain from the siphoning tube (45) and surrounding rain collection container (25) by way of the open, first end (50) of the siphoning tube, which is protruding through the bottom hole (40) of the rain collection container (25). The rain collecting container (25) can be cylindrical, rectangular, or can have other shapes. The rain collecting container can be made of glass, plastic, plexiglass, and other similar materials.

Figure 2B:
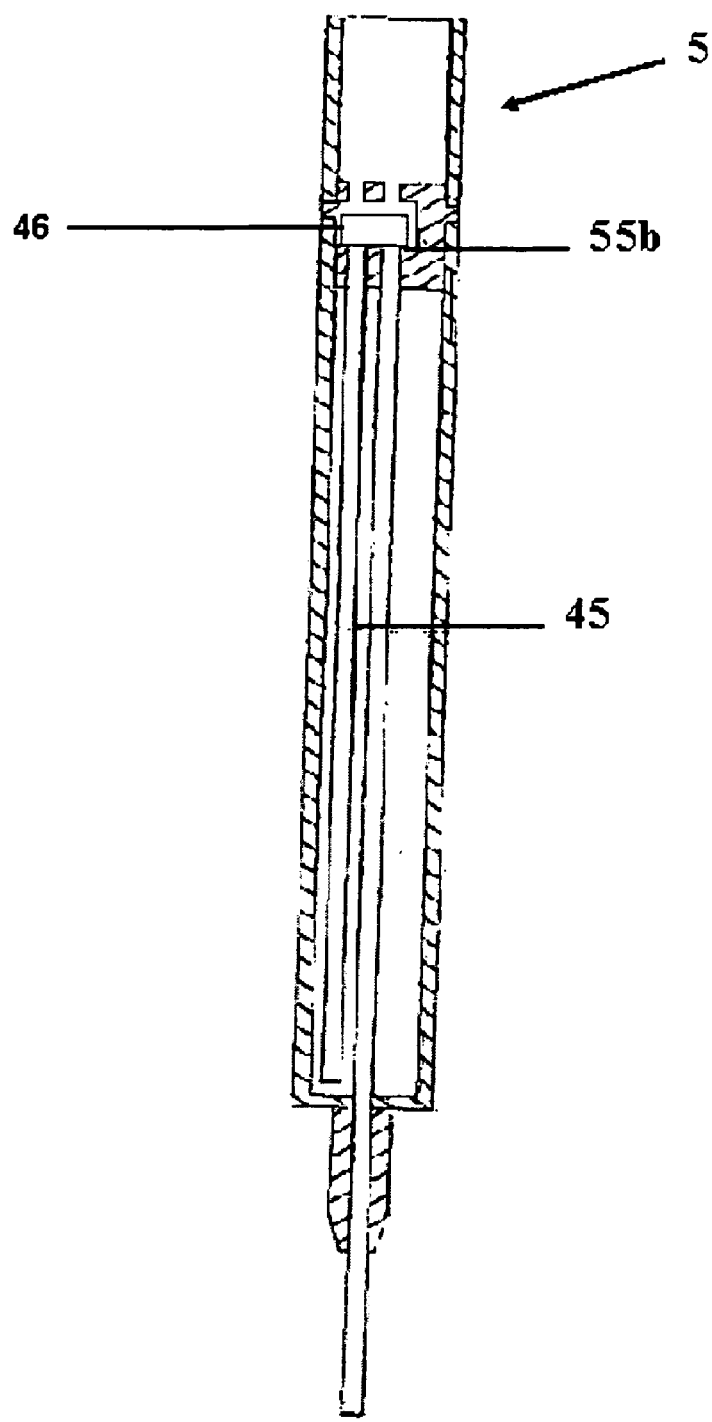
FIG. 2b depicts a cross-sectional side view of a self-dumping rain gauge with an intersecting midpoint of a siphoning tube within a rain gauge.

FIG. 2b depicts a cross-sectional side view of a self-dumping rain gauge (5) with an intersecting midpoint (55b) of a siphoning tube (45). The siphoning tube is located within the rain gauge and the intersecting midpoint can be an alternative embodiment. The float (46) can be in the plug above the channels.

Figure 3:
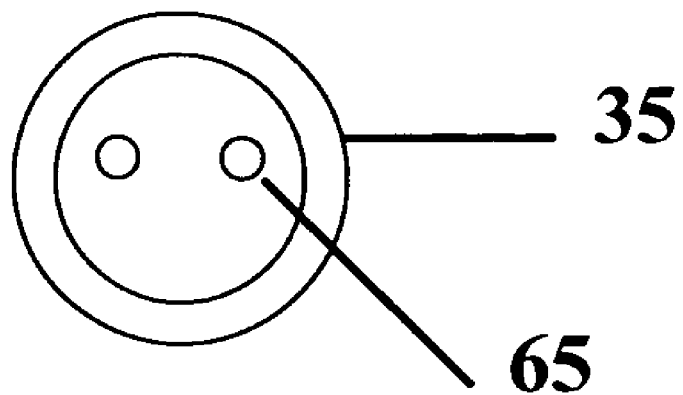
FIG. 3 depicts a top view of a plug with channels.

FIG. 3 depicts a top view of a plug (35) with two channels (65) for a self-dumping rain gauge.

While these embodiments have been described with emphasis on the preferred embodiments, it can be understood that within the scope of the appended claims, the embodiments might be practiced other than as specifically described herein.

What is claimed is:

1. A self-dumping rain gauge comprising:
   a. a rain collection container with indications, wherein the rain collection container comprises a top hole and a bottom hole;
   b. a siphoning tube located within the rain collection container, wherein the siphoning tube comprises a first end, a second end and a midpoint, and wherein the first end protrudes through the bottom hole;
   c. a replaceable rain collector cap, wherein the replaceable rain collector cap comprises a rain collection chamber;
   d. a plug with channels; and
   f. a removable flat surface attached to the rain collection container, wherein the flat surface comprises at least one set of numbers.

2. The self-dumping rain gauge of claim 1, wherein the plug with channels further comprises a float.

3. The self-dumping rain gauge of claim 1, wherein the indications are at two separate sets of graduation marks.

4. The self-dumping rain gauge of claim 1, wherein the midpoint of the siphoning tube is curved.

5. The self-dumping rain gauge of claim 1, wherein the rain collection container is made from a member selected from the group consisting of: plastic, glass, plexiglass, and combinations thereof.

6. The self-dumping rain gauge of claim 1, wherein the rain collection container has a shape from a member of the group consisting of: cylindrical, rectangular, and combinations thereof.

7. A self-dumping rain gauge comprising:
   a rain collection container with indications, wherein the rain collection container comprises a top hole and a bottom hole;
   b. a siphoning tube located within the rain collection container, wherein the siphoning tube comprises a first end, a second end and a midpoint, and wherein the first end protrudes through the bottom hole;
   c. wherein the midpoint of the siphoning tube is intersecting tubes;
   d. a replaceable rain collector cap, wherein the replaceable rain collector cap comprises a rain collection chamber; and
   e. a plug with channels.

8. A self-dumping rain gauge comprising:
  a. a rain collection container with indications, wherein rain collection container comprises a top hole and a bottom hole;
  b. a siphoning tube located within the rain collection container, wherein the siphoning tube comprises a first end, a second end and a midpoint, and wherein the first end protrudes through the bottom hole;
  c. a plug with channels located in the top hole; and
  d. a removable flat surface attached to the rain collection container, wherein the flat surfaces comprises at least one set of numbers.

9. The self-dumping rain gauge of claim 8, wherein plug with channels further comprises a float.

10. The self-dumping rain gauge of claim 8, wherein the indications are at two separate sets of graduation marks.

11. The self-dumping rain gauge of claim 8, wherein the midpoint of the siphoning tube is curved.

12. The self-dumping rain gauge of claim 8, wherein the rain collection container is made from a member selected from the group consisting of: plastic, glass, plexiglass, and combinations thereof.

13. The self-dumping rain gauge of claim 8, wherein the rain collection container has a shape from a member of the group consisting of: cylindrical, rectangular, and combinations thereof.

14. A self-dumping rain gauge comprising:
  a. a rain collection container with indications, wherein the rain collection container comprises a top hole and a bottom hole;
  b. a siphoning tube located within the rain collection container, wherein the siphoning tube comprises a first end, a second end and a midpoint, and wherein the first end protrudes through the bottom hole;
  c. wherein the midpoint of the siphoning tube is intersecting tubes; and
  c. a plug with channels located in the top hole.

* * * * *